US009146941B2

(12) United States Patent
Lin et al.

(10) Patent No.: US 9,146,941 B2
(45) Date of Patent: Sep. 29, 2015

(54) IMAGE TAG PAIR GRAPH FOR IMAGE ANNOTATION

(75) Inventors: Zhe Lin, Fremont, CA (US); Jonathan Brandt, Santa Cruz, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 326 days.

(21) Appl. No.: 13/566,677

(22) Filed: Aug. 3, 2012

(65) Prior Publication Data
US 2014/0037195 A1 Feb. 6, 2014

(51) Int. Cl.
*G06K 9/62* (2006.01)
*G06F 17/30* (2006.01)
(52) U.S. Cl.
CPC .... *G06F 17/30268* (2013.01); *G06F 17/30247* (2013.01)
(58) Field of Classification Search
CPC ............... G06F 1117/30247; G06F 17/30268; G06K 9/00677
See application file for complete search history.

(56) References Cited

U.S. PATENT DOCUMENTS

2010/0228691 A1* 9/2010 Yang et al. ...................... 706/12

OTHER PUBLICATIONS

Fregus, Rob, et al., "Semi-supervised Learning in Gigantic Image Collections", NIPS 2009, 9 pgs.
Guillaumin, Matthieu, et al., "TagProp: Discriminative metric learning in nearest neighbor models for image auto-annotation", 2009 IEEE 12th International Conference on Computer Vision, (2009), 309-316.
Liu, Jing, et al., "Image annotation via graph learning", Pattern Recognition, 42(2), (2009), 218-228.
Makadia, A., et al., "A New Baseline for Image Annotation", ECCV '08 Proceedings of the 10th European Conference on Computer Vision: Part III, (2008), 316-329.
Zhu, Xiaojin, et al., "Semi-Supervised Learning Using Gaussian Fields and Harmonic Functions", Proceedings of the Twentieth International Conference on Machine Learning (ICML-2003), Washington DC, 2003., 9 pgs.

* cited by examiner

*Primary Examiner* — Chan Park
*Assistant Examiner* — Elisa Rice
(74) *Attorney, Agent, or Firm* — Shook Hardy & Bacon L.L.P.

(57) ABSTRACT

An approach is described for automatically tagging a single image or multiple images. The approach, in one example embodiment, is based on a graph-based framework that exploits both visual similarity between images and tag correlation within individual images. The problem is formulated in the context of semi-supervised learning, where a graph modeled as a Gaussian Markov Random Field (MRF) is solved by minimizing an objective function (the image tag score function) using an iterative approach. The iterative approach, in one embodiment, comprises: (1) fixing tags and propagating image tag likelihood values from labeled images to unlabeled images, and (2) fixing images and propagating image tag likelihood based on tag correlation.

20 Claims, 5 Drawing Sheets

IMAGE TAG PAIR GRAPH FOR IMAGE ANNOTATION

TECHNICAL FIELD

This disclosure relates generally to the technical fields of software and/or hardware technology and, in one example embodiment, to system and method for automatically tagging unlabeled images.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

With the popularity of digital cameras, it becomes much easier for people to take pictures. However, organizing a large number of pictures is hard. As a result, many people have thousands of photos sitting on their hard disk in some miscellaneous folder. Annotating images with tags is an effective way to organize images. Manual annotation is time consuming, while automatic approaches are not always reliable due to the semantic gap between low level visual features and high level semantic concepts.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
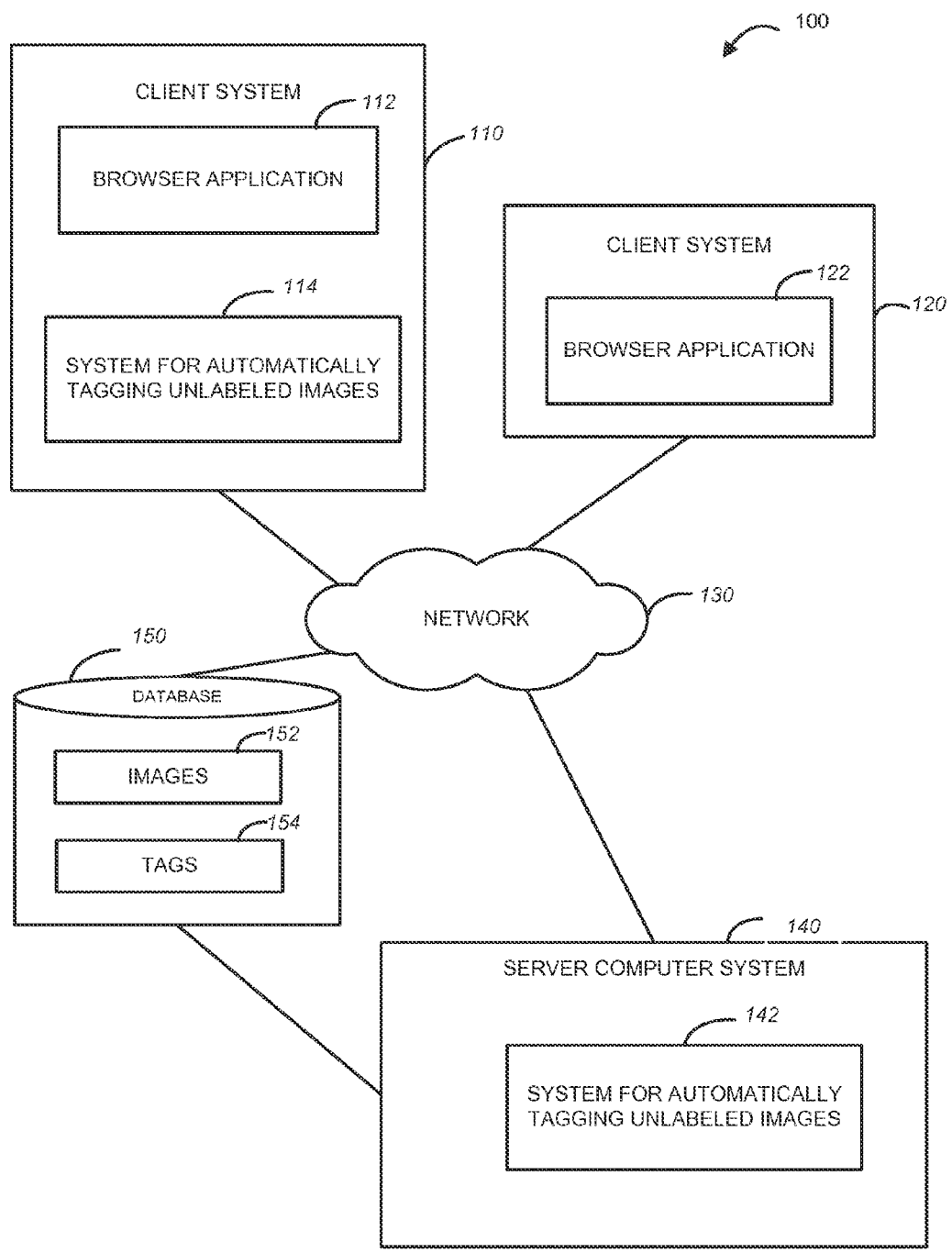
FIG. 1 is a block diagram showing a network environment within which a method and system for automatically tagging unlabeled images may be implemented, in accordance with an example embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

An approach is proposed for automatically tagging a single image or multiple images. The approach, in one example embodiment, is based on a graph-based framework that exploits both visual similarity between images and tag correlation within individual images. The problem is formulated in the context of semi-supervised learning, where a graph modeled as a Gaussian Markov Random Field (MRF) is solved by minimizing an objective function (the image tag score function) using an iterative approach. The iterative approach, in one embodiment, comprises two steps: (1) fixing tags and propagating image tag likelihood values from labeled images to unlabeled images, and (2) fixing images and propagating image tag likelihood based on tag correlation.

A graph-based approach may be used to automatically tag unlabeled images given a set of fully or partially annotated images. For example, a system for automatically tagging unlabeled images may be configured such that users only need to label a small portion of their images. These user-supplied tags would be propagated to other images. The assumption may be made that where there exists a correlation between images (such as, e.g., in personal collections of digital photographs) many images may be described by the same or similar tags. It will be noted that, for the purposes of this description, the words tag and label (also tagging and labeling) may be used interchangeably.

The framework for automatically tagging unlabeled images may be extended to cases where each image can be associated with an arbitrary number of tags, and where the entire pool of available tags can be very large. In one embodiment, under these conditions, the graph optimization problem may be solved utilizing an iterative alternating scheme with a new joint image tag graph model that combines the examination of similarity among images with the examination of correlation among tags.

Example method and system for automatically tagging unlabeled images may be described with reference to a network environment illustrated in FIG. 1. The network environment 100 may include one or more computer systems, such as client computer systems 110 and 120 and a server computer system 140. The server computer system 140 and the client computer systems 110 and 120 may be in communication with each other via a communications network 130. The communications network 130 may be a public network (e.g., the Internet, a wireless network, a public switched telephone network (PSTN), etc.) or a private network (e.g., LAN, WAN, Intranet, etc.).

As shown in FIG. 1, the server computer system 140 hosts a system for automatically tagging unlabeled images 142. The system for automatically tagging unlabeled images 142 may be configured to have access to a collection of images, some of which may have respective user-supplied descriptive labels. The images may be stored locally with respect to the client system that is accessing a system for automatically tagging unlabeled images or is a repository accessible to the system for automatically tagging unlabeled images. e.g., in a database 150 that stores images 152 and tags 154. The system 142 creates a plurality of image tag pairs from the collection of images and the available tags. The tags may include user-provided tags, as well as reference tags. Each image tag pair is assigned a probability value that indicates a likelihood of a tag from a pair being descriptive of an image from the pair. In one embodiment, if the tag from the pair is selected by a user to describe the image from the pair, the assigned probability value is 1. Otherwise, the assigned probability value is 0.5.

For each tag, the system 142 examines the image tag pairs for similarity between the respective images. Based on the determined similarity between two images from the image tag pairs that have different images but the same tag, the probability value for one or both pairs is adjusted. For example, an image may have been labeled by a user and is now associated with a user-selected tag, so that the resulting image tag pair is assigned the probability value of 1 (indicating the highest certainty of a tag describing an image). The determined similarity of another, unlabeled, image with this user-labeled image would result in increasing the probability value of the image tag pair consisting of the unlabeled image and the tag that is the same as the user-selected tag. The similarity of images may be determined using a variety of approaches by comparing respective visual features of the images.

For each image, the system 142 examines the image tag pairs for correlation between the respective tags. Based on the result of the examination, the assigned probability is adjusted for one or both of the image tag pairs that have different tags but the same image. For example, if one pair from two image tag pairs has higher probability value than the other pair, and if it is determined that there is a certain degree of correlation between the respective tags from the two pairs, the probability value is adjusted upwards for the pair with a probability value. A tag may be stored as associated with one or more classifiers. For example, the tag "beach" may include classifiers "sand," "sky," and "volleyball." Based on the examination of these classifiers, another tag that has one or more of these classifiers may be identified as correlated with the "beach" tag.

The process of examining the image tag pairs with respect to similarity of imaged and tag correlation and selectively adjusting respective probability values is continued iteratively until respective probability values associated with the tag image pairs become stable. The images may include user-supplied images (e.g., a user's personal collection of digital photos), and may also include reference images provided by or accessible via the system for automatically tagging unlabeled images 142. The tags may also include user-supplied tags (e.g., descriptive labels selected or created by the user), as well as reference tags provided by or accessible via the system for automatically tagging unlabeled images 142.

The system for automatically tagging unlabeled images 142 may be a web application accessible by the client computer systems 110 and 120 via respective browser applications 112 and 122 executing on the client computer system 122. In some embodiments, a system for automatically tagging unlabeled images may reside at a client computer system, such as, e.g. the system for automatically tagging unlabeled images 114 that resides on the client computer system 110. An example system for automatically tagging unlabeled images may be discussed with reference to FIG. 2.

Figure 2:
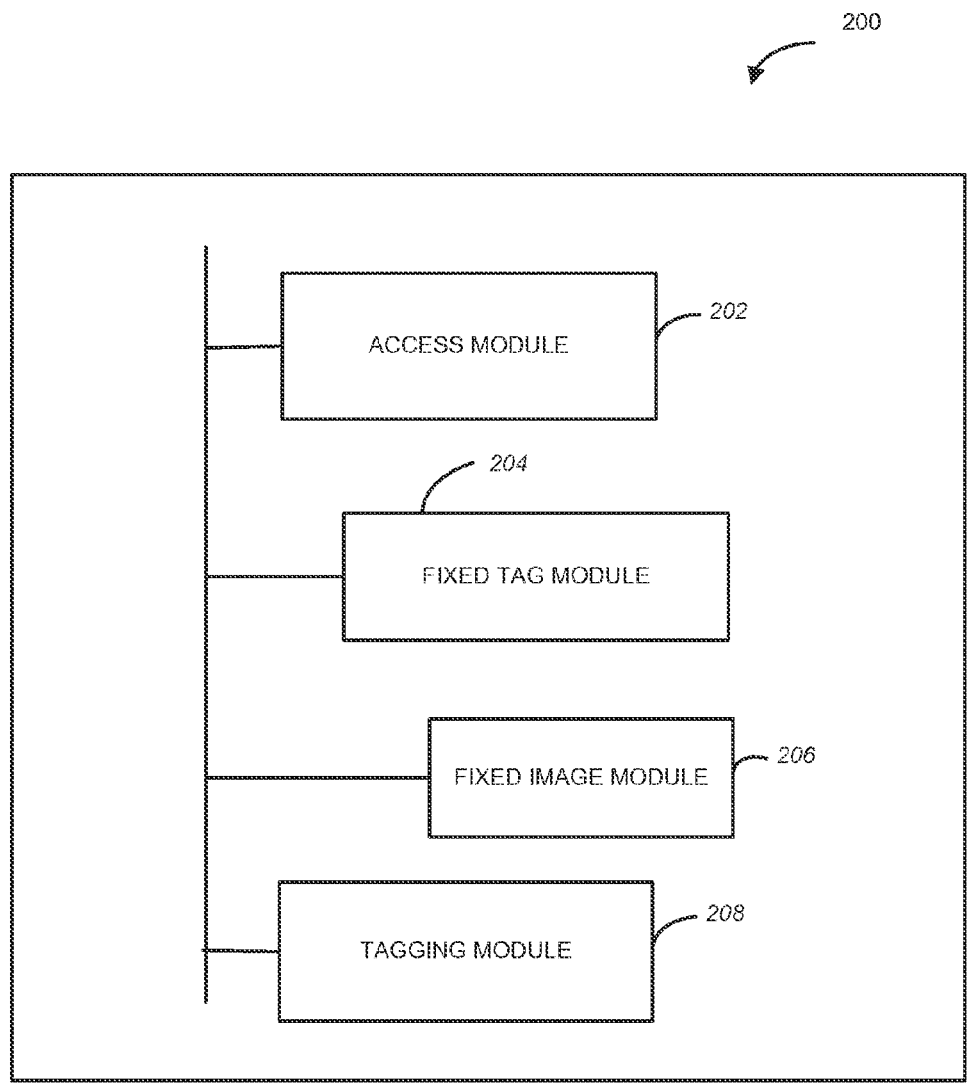
FIG. 2 is a block diagram illustrating a system for automatically tagging unlabeled images, in accordance with an example embodiment.

FIG. 2 shows a block diagram illustrating a system 200 for automatically tagging unlabeled images, according to one example embodiment. As shown in FIG. 2, the system 200 includes an access module 202, a fixed tag module 204, and a fixed image module 206. The access module 202 may be configured to access an image tag pair from a plurality of image tag pairs, each image tag pair from the plurality of image tag pairs comprising an image from a plurality of images and a tag from a plurality of tags, each pair from the plurality of image tag pairs being assigned a probability value, the probability value indicating a likelihood of a tag from a pair being descriptive of an image from the pair. The fixed tag module 204 may be configured to iterate through tags in the plurality of tags and, for each subject tag from the plurality of tags perform the following operations: (1) examine subject tag pairs, the subject tag pairs being those pairs from the plurality of image tag pairs that include the subject tag, and (2) for each of the subject tag pairs, adjust its assigned probability value, based on a result of the examining of the subject tag pairs.

The fixed image module 206 may be configured to iterate through images in the plurality of images and, for each image from the plurality of images perform the following operations: (1) examine subject image pairs, the subject image pairs being those pairs from the plurality of image tag pairs that include the subject image, and (2) for each of the subject image pairs, adjust its assigned probability value, based on a result of the examining of the subject image pairs.

Also shown in FIG. 2 is a tagging module 208. The tagging module 208 may be configured to tag unlabeled images from the plurality of images based on the respective probability values. The tagging module 208 is to tag unlabeled images responsive to determining that respective probability values associated with the subject tag pairs and the subject image pairs have become stable. Various operations performed by the system 200, according to an example embodiment, may be discussed with reference to FIG. 3.

Figure 3:
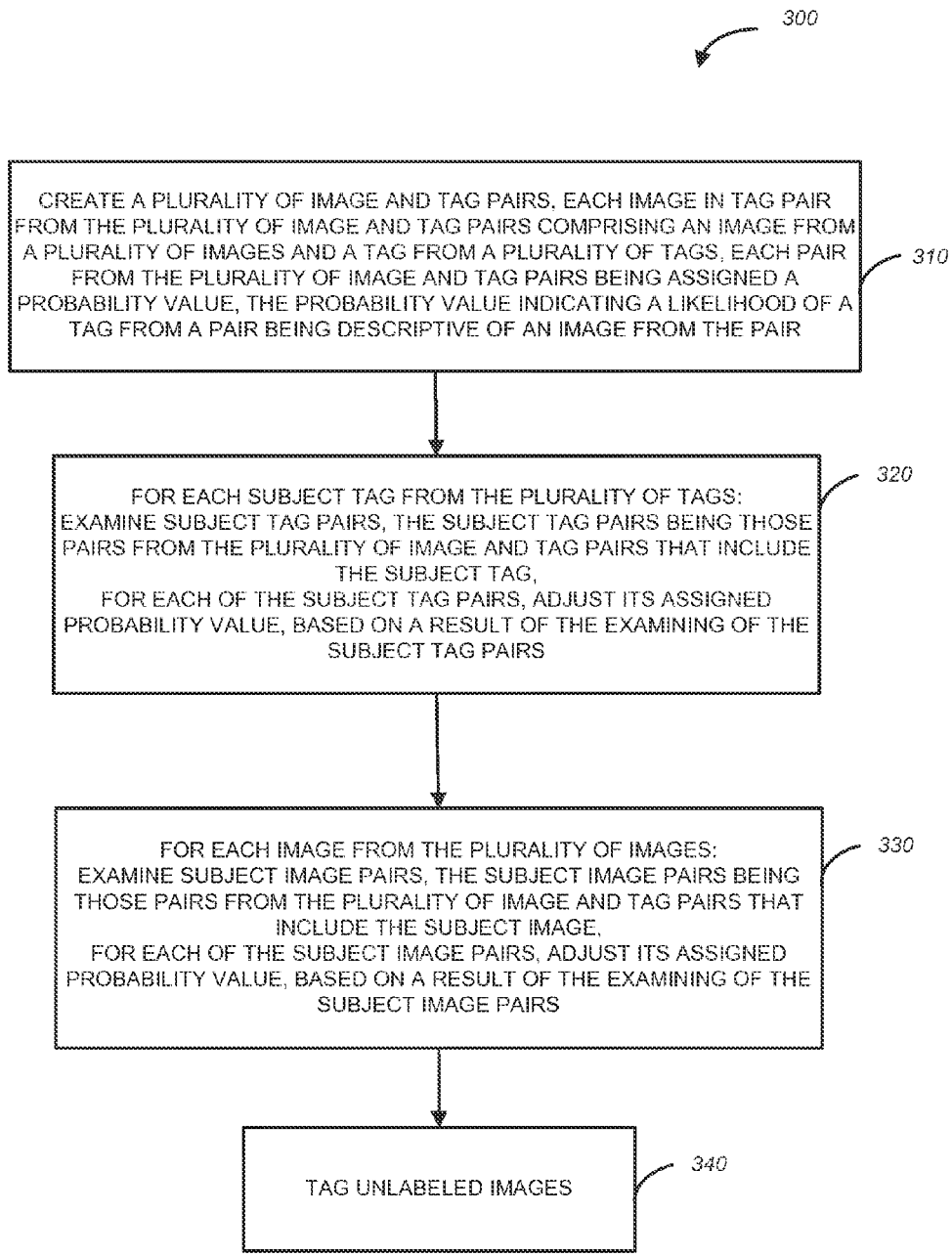
FIG. 3 is a flow chart illustrating a method for automatically tagging unlabeled images, in accordance with an example embodiment.

FIG. 3 is a flow chart illustrating a method 300 for automatically tagging unlabeled images, in accordance with an example embodiment. The method 300 may be performed by processing logic that may comprise hardware (e.g. dedicated logic, programmable logic, microcode, etc.), software (such as run on a general purpose computer system programmed to perform particular functions pursuant to instructions from program software or on a dedicated machine), or a combination of both. The processing logic, according to example embodiments, may reside in any of the modules shown in FIG. 2. The modules illustrated in FIG. 2 may be implemented as software, hardware, or a combination of both.

As shown in FIG. 3, the method 300 for automatically tagging unlabeled images commences with operation 310, where the access module 202 of FIG. 1 accesses an image tag pair from a plurality of image tag pairs. As mentioned above, each image tag pair from the plurality of image tag pairs comprises an image from a plurality of images and a tag from a plurality of tags and is also assigned a probability value. The probability value indicates a likelihood of a tag from a pair being descriptive of an image from the pair. At operation 320, the fixed tag module 204 of FIG. 1 iterates through tags in the plurality of tags and, for each subject tag from the plurality of tags and performs the following operations: (1) examines subject tag pairs to determine similarity between respective images, the subject tag pairs being those pairs from the plurality of image tag pairs that include the subject tag, and (2) for each of the subject tag pairs, adjusts its assigned probability value, based on a result of the examining of the subject tag pairs.

At operation 330, the fixed image module 206 of FIG. 1 iterates through images in the plurality of images and, for each image from the plurality of images perform the following operations: (1) examines subject image pairs to determine correlation between respective tags, the subject image pairs being those pairs from the plurality of image tag pairs that include the subject image, and (2) for each of the subject image pairs, adjusts its assigned probability value, based on a result of the examining of the subject image pairs. At operation 340, the fixed image module 208 of FIG. 1 tags unlabeled images.

Semi-Supervised Learning Approach Using a Gaussian Markov Random Field (MRF)

Given a set of labeled images and unlabeled images, the semi-supervised learning approach provides a closed form solution to propagate confidences from labeled to unlabeled images based on the assumption that the graph is modeled by Gaussian Markov Property. We represent an image is represented as a point on the graph and the similarity between two images is represented as the graph edge.

Given l points that represent labeled images $\{(x_i; y_i)\}_{i=1...l}$ and u points that represent unlabeled images $\{(x_i; y_i)\}_{i=l+1,...,l+u}$ (where n=l+u and l<<u), a graph G=(V,E) is constructed with nodes V. The graph represents n data points (lying in m-dimensional space) consisting of labeled node set L=1, . . . , l and unlabeled node set U=l+1, . . . , l+u. By defining node similarity based on the visual similarity between images, a symmetric weight graph is defined by equation (1) as shown in Table 1 below.

TABLE 1

$$w_{ij} = \exp\left(-\sum_{d=1}^{m} \frac{(x_{id} - x_{jd})^2}{\sigma_d^2}\right), \quad (1)$$

In equation (1), $x_{id}$ is the d-th component of instance $x_i$, and $\sigma_d$ is the length scale hyperparameters for each dimension.

Considering a real-valued function f: V→R on G as potential scores on each node, the final estimate of f may be used to assign tags for unlabeled images. In order to solve the MRF, a quadratic energy function is defined by equation (2) as shown in Table 2 below.

TABLE 2

$$E(f) = \frac{1}{2}\sum_{i,j} w_{ij}(f_i - f_j)^2. \quad (2)$$

The goal is to minimize E(f) subject to $f(i)=f_l(i)=y_i$. Intuitively, it is desirable that similar images (represented on the graph as data points) to have similar labels. To assign a probability distribution on functions f, the Gaussian field is formed as shown in Table 3 below.

TABLE 3

$$p_\beta(f) = \frac{\exp(-\beta E(f))}{Z_\beta},$$

where β is an "inverse temperature" parameter, and $Z_\beta$ p is the partition function
$Z_\beta = \int_{f|L=f_l} \exp(-\beta E(f))df$,
which normalizes overall functions conslrained to $f_l$ on the data that represent labeled images.

The minimum energy function is shown in Table 4 below.

TABLE 4

$$f = \arg\min_{f|L=f_l} E(f)$$

It is not difficult to show that the minimum energy function shown in Table 4 above is harmonic is harmonic (i.e. Δf=0 on U and is equal to $f_l$ on L), here Δ is the combinatorial Laplacian, given in matrix form as Δ=D−W where D=diag($d_i$) is the diagonal matrix with entries $d_i=\Sigma_j w_{ij}$ and W=[$w_{ij}$] is the weight matrix. The harmonic property means that the value of f at U is the average of f at neighboring points as is expressed in equation (3) in Table 5.

TABLE 5

$$f(j) = d_j \sum_{(i,j) \in N} w_{ij} f(i). \quad (3)$$

This also enforces the smoothness of f w.r.t. the graph G on the neighboring points. In the matrix form, it can be written as: f=Pf, where P=D$^{-1}$W. According to the principle of harmonic functions, f is unique and satisfies 0<f(j)<1 for j∈U. The weight matrix can be re-written as a 2×2 block structure W=[$W_{ll}$|$W_{lu}$;$W_{ul}$|$W_{uu}$]. Letting f=($f_l$; $f_u$)$^T$, the harmonic solution Δf=0 subject to f|L=$f_l$ is shown as equation (4) in Table 6 below.

TABLE 6

$$f_u = (D_{uu} - W_{uu})^{-1} W_{ul} f_l = (I - P_{uu})^{-1} P_{ul} f_l. \quad (4)$$

The above basic framework can also be extended with external classifiers. The external classifier trained for each tag produces a soft confidence score $h_u \in (0; 1)$ on the unlabeled data. A soft confidence score $h_u$ can be combined with the basic graph framework as follows. For each unlabeled node i in the original graph, a so-called "dongle" node is attached, which is a labeled node with value $h_i$, let the transition probability from i to its dongle be η, and discount all other transitions from i by 1−η. Now, harmonic optimization can be performed on this augmented graph, and the closed form solution for f is shown as equation (5) in Table 7 below.

TABLE 7

$$f_u = (I - (1-\eta)P_{uu})^{-1}((1-\eta)P_{ul}f_l + \eta h_u). \quad (5)$$

As stated above, the graph-based approach described herein exploits both visual similarity between images and tag correlation within individual images. When the joint image tag graph-based method is being performed, each picture can usually be annotated by multiple tags. However, there is strong correlation between tags. For example, a picture contains "car" usually has "road" inside as well. So knowing the presence of some correlated tags could help predict the presence of a new tag. The approach described herein uses the system for tagging unlabeled imaged by jointly modeling tag correlation in the semi-supervised graph learning framework.

In this paradigm, each node in the graph models an image tag pair, $\{x_i, t_j\}$, where x, denotes the $i^{th}$ image, and $t_j$ denotes the $j^{th}$ tag. The class label (that can be assigned a probability value indicating a likelihood of a tag from a pair being descriptive of an image from the pair) of each node is a binary variable. The class label is a binary value variable associated with an image node in the graph) that indicates whether the given image contains the given tag. The class label thus denotes whether that particular image should be associated with that particular tag. As only a small portion of images from the entire set have been labeled, such that they have user-selected tags associated with them, these user-selected tags (as well as reference tags, if any) can be propagated to unlabeled images. The probability value indicates a likelihood of a tag from a pair being descriptive of an image from the pair.

In one example embodiment, a weight value (also termed a probability value) may be calculated for each pair of nodes (as mentioned above, a node, for the purposes of this description, is an image tag pair). Some potential scenarios are as follows: (i) for two nodes that share the same tag, the weight value is calculated as the similarity of image visual features (as, e.g., in the approach using a Gaussian Markov random field); (ii) for two nodes that share the same image, the weight value is calculated based on the correlation between the respective two tags; (iii) for two nodes that don't share images or tags, the weight value may be set as 0, meaning that the two nodes are independent of each other. This yields a large symmetric weighted graph. In order to solve such a graph, in one example embodiment, an iterative approach is utilized. At each iteration, a subset of nodes is involved. An example iterative approach is described below.

First, the class labels of all the nodes are initialized: for labeled nodes, their ground truth is used; for unlabeled nodes, the label probabilities are initialized as [0.5; 0.5]. Then, the system for automatically tagging unlabeled images iterates over tags. At each iteration, only the class labels of unlabeled nodes for one specific tag are updated, the class labels of the other nodes are fixed. In order to update the class label confidence probabilities, equation (5) shown in Table 7 above can be used.

For example, suppose tag j is being considered in the current iteration. All the nodes associated with the other tags are considered as "dongle" nodes and can be interpreted as external classifiers. For example, a tag labeled "car" shows some positive evidence to annotate the same image using the "road" tag. Each image-tag pair (i; j)(i-th image with j-th tag) is connected to a "virtual" dongle node that encapsulates information from all pairs (i; l); l≠j. For the image-tag pair node (i; j), the external cue h can be calculated using equation (6) shown in Table 8 below.

TABLE 8

$$h_i = \sum_{l=1...j-1} C_j^l P_{il} + \sum_{l=j+1...L} C_j^l P_{il}, \quad (6)$$

where $P_{il}$ denotes the confidence of labeling the node $\{x_i; t_i\}$ as 1 or 0, and $C_j^l$ denotes the correlation the l-th tag regarding the j-th tag.

Correlation $C_j^l$ is an asymmetric measure between two tags j and l. Formally, $C_j^l$ can be calculated as the normalized co-occurrence probability using equation (7) shown in Table 9 below.

TABLE 9

$$C_j^l = \frac{\hat{C}_j^l}{\sum_j \hat{C}_j^l}, \text{ where } \hat{C}_j^l = \frac{\text{co-occurence}(j, l)}{\text{occurence}(j)}. \quad (7)$$

For each tag, equation (5) can be used to update $P_{ij}$ for the image-tag pair node (i; j). After doing such iteration over all the tags, the labeling of all the nodes can be achieved eventually. The iteration process is terminated if $P_{ij} < \epsilon$ for all unlabeled image-tag pair nodes. Finally, the subset of tags j with $P_{ij} > 0.5$ is assigned to image i. Implementation details of the method for automatically tagging unlabeled images are described below.

For image similarity, the system for automatically tagging unlabeled images may be configured to utilize techniques such as computing global color histogram, extracting the spatial frequency information from an image, using spatial pyramid matching for recognizing natural scene categories, generating histograms of oriented gradients for human detection, etc. The system also may be configured to use a weighted sum of distances to compute a distance between any pair of images. The node similarity, i.e., the visual similarity between two images, may be computed using logistic function sim=exp(−dist) of the image distance. That is, by any of the above-mentioned techniques, or other methods, a set of features is computed for a given image. These features are aggregated into a feature vector of a particular fixed dimensionality. The feature vector for a given image can be regarded as a point in the feature space $R_n$, where n is the dimensionality of the feature vector. The image distance in this context is the metric distance between the corresponding points in feature space determined by each of the respective images. The distance can be Euclidean norm, or some other commonly used metric. The system for automatically tagging unlabeled images may compute tag correlation probabilities utilizing a collection of ground truth tags that may be provided offline.

Example Application of the Method for Tagging Unlabeled Images

Figure 4:
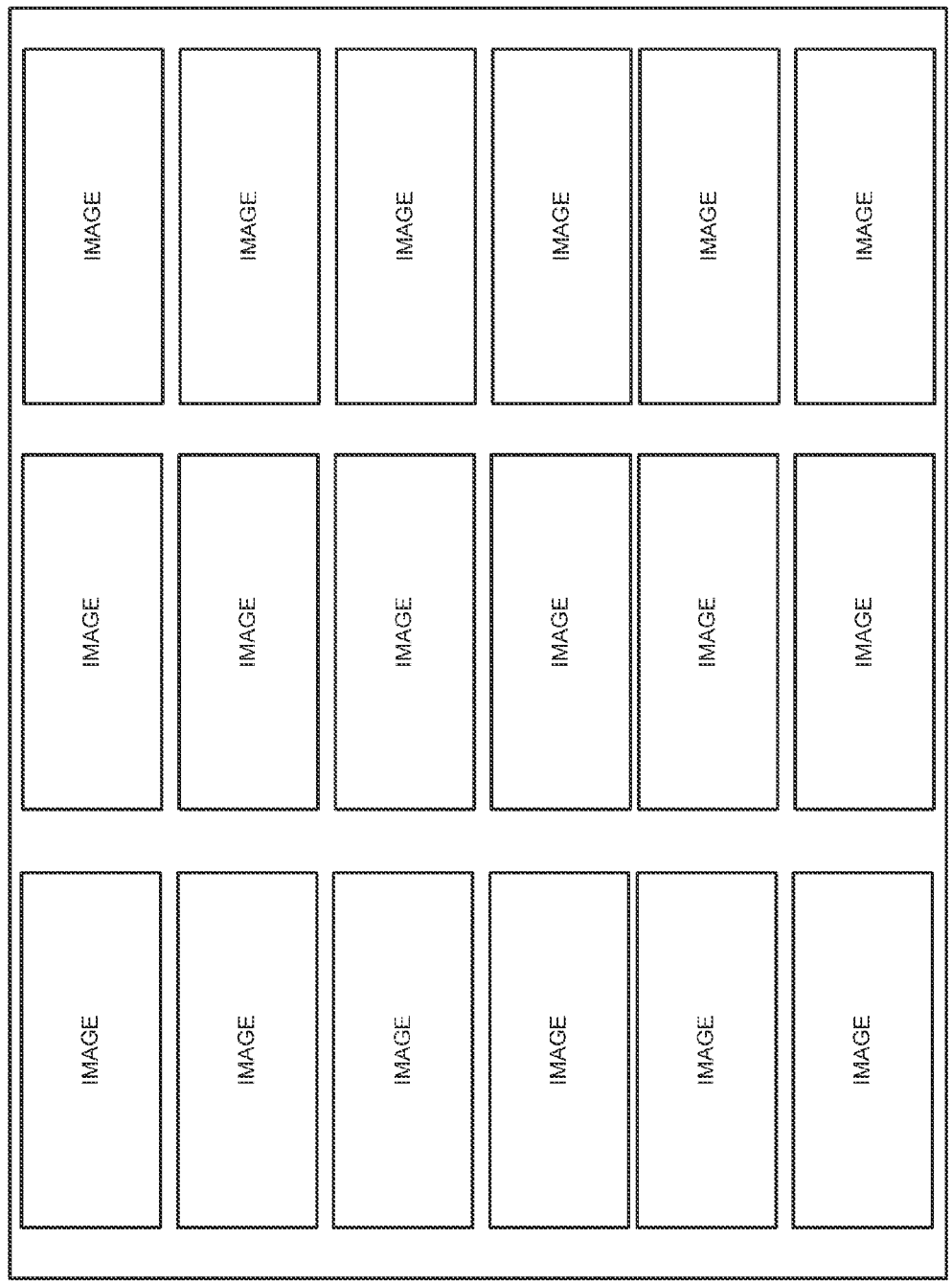
FIG. 4 illustrates a collection of test images for applying the method for tagging unlabeled images in accordance with an example embodiment.

In operation, and for the purpose of demonstrating an example application of the method described herein, 100 most common tags have been chosen from among randomly downloaded 686,283 images based on their respective frequencies of occurrence. These tags have been used as the initial tag pool for image annotation. For testing, a family album consisting of 1802 images was also downloaded from an image-storage website. A sample set of images are shown in FIG. 4. These user tag inputs have been used as the ground truth for the evaluation. Of the method for tagging unlabeled images described above. The set tags used in the experiments are: adventure, air, auto, bar, beautiful, beauty, boy, building, cafe, car, celebration, child, children, city, cloud, club, conference, cooking, costume, cup, cute, dad, dinner, door, dress, drinking, eyes, face, family, female, field, flowers, food, forest, friend, funny, game, games, garden, gardens, girl, girls, glass, grass, group, hair, happy, hill, home, hotel, house, kid, kids, kitchen, leaf leaves, light, lights, male, man, mom, mountain, nature, office, outdoor, outside, party, people, plant, play, restaurant, river, road, roadtrip, rock, sand, shirt, show, sky, skyline, smile, sport, stone, street, summer, sun, team, town, travel, tree, trees, trip, tshirt, valley, wall, water, window, wine, woman, wood. In the performance evaluation the following pairs of tags have been treated as the same class: (child, children), (game, games), (girl, girls), (kid, kids), (light, lights), (tree, trees).

This yields a graph consisting of 1802×100 nodes. Given pre-computed image descriptors, the method described herein took approximately half-an-hour (in one example implementation implementation) to propagate all the tags to unlabeled images, which may be an indicator of improved performance as compared to some of the existing techniques.

Figure 5:
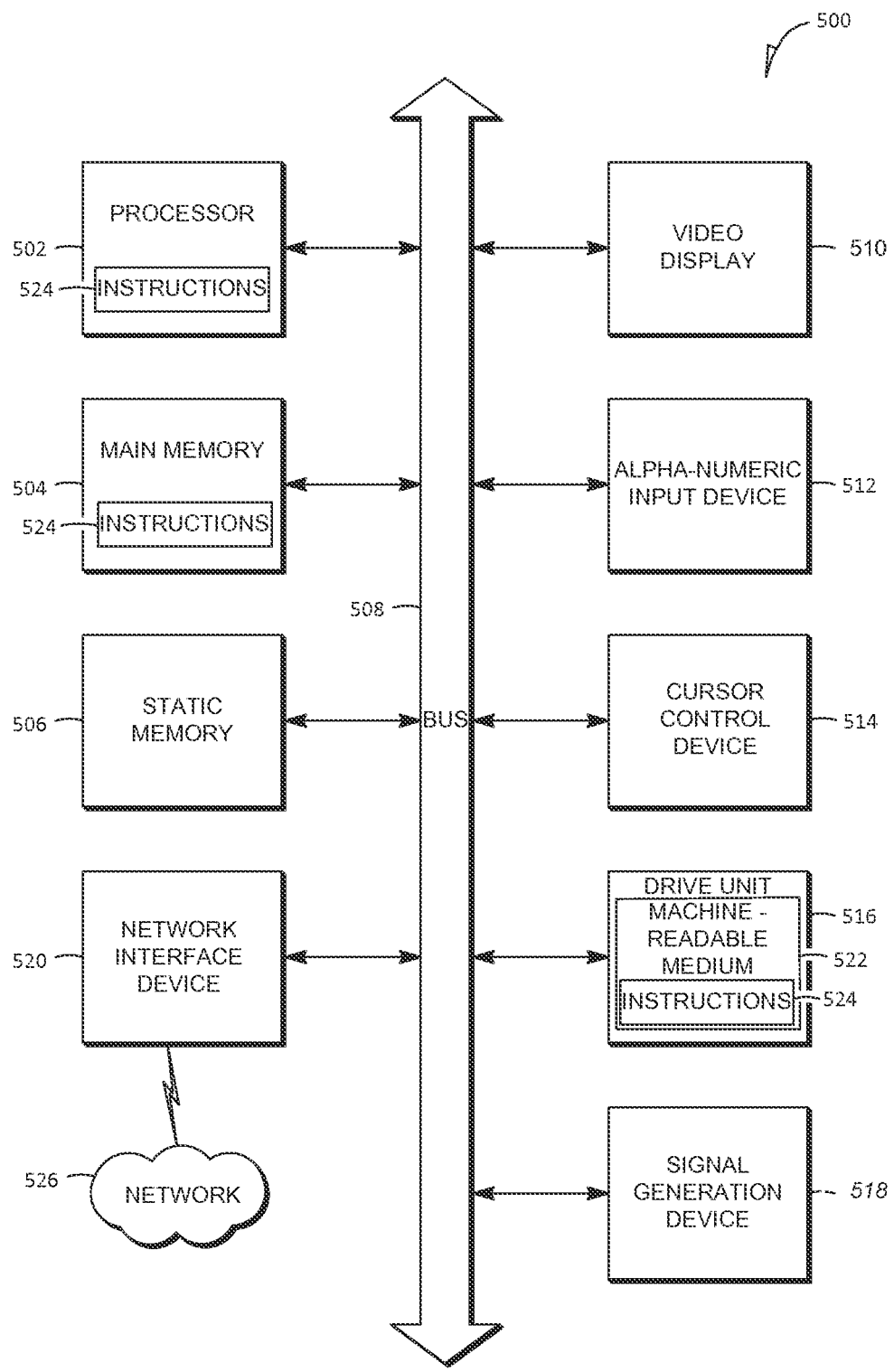
FIG. 5 is a diagrammatic representation of a machine in the example form of a computer system within which a set of instructions, for causing the machine to perform any one or more of the methodologies discussed herein, may be executed.

FIG. 5 is a diagrammatic representation of a machine in the example electronic form of a computer system 500 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an "Moving Picture Experts Group (MPEG) Layer 3" (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) cursor control device 514 (e.g., a mouse), a disk drive unit 516, a signal generation device 518 (e.g., a speaker) and a network interface device 520.

The disk drive unit 516 includes a computer-readable (or machine-readable) medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520 utilizing any one of a number of well-known transfer protocols (e.g., Hyper Text Transfer Protocol (HTTP)).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present invention, or that is capable of storing or encoding data structures utilized by or associated with such a set of instructions. The term "machine-readable medium" shall accordingly be taken to include, but not be limited to, solid-state memories, optical and magnetic media. Such medium may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented method performed by one or more processors using a plurality of images, the method comprising:
    creating a plurality of image tag pairs, each image and tag pair from the plurality of image tag pairs comprising an image from the plurality of images and a tag from a plurality of tags, each pair from the plurality of image tag pairs being assigned a probability value, the probability value indicating a likelihood of a tag from a pair being descriptive of an image from the pair;
    for each subject tag from the plurality of tags:
        examining subject tag pairs for similarity between respective images, the subject tag pairs being those pairs from the plurality of image tag pairs that include the subject tag, and
        for each of the subject tag pairs, adjusting its assigned probability value, based on a result of the examining of the subject tag pairs;
    for each image from the plurality of images:
        examining subject image pairs for correlation between respective tags, the subject image pairs being those pairs from the plurality of image tag pairs that include the subject image, and
        for each of the subject image pairs, adjusting its assigned probability value, based on a result of the examining of the subject image pairs; and
    tagging unlabeled images from the plurality of images based on the assigned probability values adjusted in the examining of the subject tag pairs for similarity between respective images and the examining of the subject image pairs for correlation between respective tags.

2. The method of claim 1, comprising iterating the examining of the subject tag pairs, the examining of the subject image pairs, and the adjusting of probability values until respective probability values associated with the subject tag pairs and the subject image pairs become stable.

3. The method of claim 2, comprising:
the tagging the unlabeled images being responsive to determining that respective probability values associated with the subject tag pairs and the subject image pairs have become stable.

4. The method of claim 1, comprising assigning to a pair from the plurality of image tag pairs a first initial probability value if a tag from the pair is a user-selected tag for an image from the pair or a second initial probability value if the tag from the pair is not a user-selected tag for the image from the pair, wherein the first initial probability value indicates the highest probability of a likelihood of a tag from a pair being descriptive of an image from the pair.

5. The method of claim 1, wherein the plurality of tag image pairs, on which the operations of examining of the subject tag pairs, examining of the subject image pairs, and adjusting of probability values until respective probability values associated with the subject tag pairs and the subject image pairs become stable are performed, are represented by a single graph.

6. The method of claim 1, wherein images from the plurality images are user-supplied images.

7. The method of claim 1, wherein images from the plurality of images include user-supplied images and reference images.

8. The method of claim 1, wherein tags from the plurality of tags include user-supplied tags and reference tags.

9. The method of claim 1, wherein a tag from the plurality of tags include one or more classifiers, a classifier from the one or more classifiers indicating that the tag is related to another tag that includes the classifier.

10. The method of claim 9, wherein the examining of the subject image pairs comprises examining respective tags from the subject image pairs based on respective classifiers of the respective tags.

11. A computer-implemented system comprising:
an access module to access an image tag pair from a plurality of image tag pairs, each image tag pair from the plurality of image tag pairs comprising an image from a plurality of images and a tag from a plurality of tags, each pair from the plurality of image tag pairs being assigned a probability value, the probability value indicating a likelihood of a tag from a pair being descriptive of an image from the pair;
a fixed tag module to iterate through tags in the plurality of tags and, for each subject tag from the plurality of tags:
examine subject tag pairs for similarity between respective images, the subject tag pairs being those pairs from the plurality of image tag pairs that include the subject tag, and
for each of the subject tag pairs, adjust its assigned probability value, based on a result of the examining of the subject tag pairs;
a fixed image module to iterate through images in the plurality of images and, for each image from the plurality of images:
examine subject image pairs for correlation between respective tags, the subject image pairs being those pairs from the plurality of image tag pairs that include the subject image, and
for each of the subject image pairs, adjust its assigned probability value, based on a result of the examining of the subject image pairs; and
a tagging module to:
tag unlabeled images from the plurality of images based on the assigned probability values adjusted in the examining of the subject tag pairs for similarity between respective images and the examining of the subject image pairs for correlation between respective tags.

12. The system of claim 11, wherein the fixed tag module and the fixed image module are to iterate the examining of the subject tag pairs, the examining of the subject image pairs, and the adjusting of probability values until respective probability values associated with the subject tag pairs and the subject image pairs become stable.

13. The system of claim 12, wherein the tagging module tags the unlabeled images responsive to determining that respective probability values associated with the subject tag pairs and the subject image pairs have become stable.

14. The system of claim 11, wherein the access module is to assign to a pair from the plurality of image tag pairs a first initial probability value if a tag from the pair is a user-selected tag for an image from the pair or a second initial probability value if the tag from the pair is not a user-selected tag for the image from the pair, the first initial probability value indicates the highest probability of a likelihood of a tag from a pair being descriptive of an image from the pair.

15. The system of claim 11, wherein the plurality of tag image pairs, on which the operations of examining of the subject tag pairs, examining of the subject image pairs, and adjusting of probability values until respective probability values associated with the subject tag pairs and the subject image pairs become stable are performed, are represented by a single graph.

16. The system of claim 11, wherein images from the plurality images are user-supplied images.

17. The system of claim 11, wherein images from the plurality of images include user-supplied images and reference images.

18. The system of claim 11, wherein tags from the plurality of tags include user-supplied tags and reference tags.

19. The system of claim 11, wherein a tag from the plurality of tags include one or more classifiers, a classifier from the one or more classifiers indicating that the tag is related to another tag that includes the classifier.

20. A machine-readable non-transitory medium having instruction data to cause a machine to:
access an image tag pair from a plurality of image tag pairs, each image tag pair from the plurality of image tag pairs comprising an image from a plurality of images and a tag from a plurality of tags, each pair from the plurality of image tag pairs being assigned a probability value, the probability value indicating a likelihood of a tag from a pair being descriptive of an image from the pair;
iterate through tags in the plurality of tags and, for each subject tag from the plurality of tags:
examine subject tag pairs for similarity between respective images, the subject tag pairs being those pairs from the plurality of image tag pairs that include the subject tag, and
for each of the subject tag pairs, adjust its assigned probability value, based on a result of the examining of the subject tag pairs;
iterate through images in the plurality of images and, for each image from the plurality of images:
examine subject image pairs for correlation between respective tags, the subject image pairs being those pairs from the plurality of image tag pairs that include the subject image, and
for each of the subject image pairs, adjust its assigned probability value, based on a result of the examining of the subject image pairs; and tag unlabeled images from the plurality of images based on the assigned probability values adjusted in the examining of the subject tag pairs for similarity between respective images and the examining of the subject image pairs for correlation between respective tags.

* * * * *